US009577871B2

(12) United States Patent
Xia et al.

(10) Patent No.: US 9,577,871 B2
(45) Date of Patent: Feb. 21, 2017

(54) METHOD AND DEVICE OF INTERFACE REGISTRATION FOR A NETWORK DEVICE TO JOIN IN A CLUSTER SYSTEM

(71) Applicant: Huawei Technologies Co., Ltd., Shenzhen, Guangdong (CN)

(72) Inventors: Yinben Xia, Shenzhen (CN); Yan Li, Shenzhen (CN); Xuefei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 484 days.

(21) Appl. No.: 14/160,227

(22) Filed: Jan. 21, 2014

(65) Prior Publication Data
US 2014/0136677 A1 May 15, 2014

Related U.S. Application Data

(63) Continuation of application No. PCT/CN2011/077437, filed on Jul. 21, 2011.

(51) Int. Cl.
*G06F 15/173* (2006.01)
*H04L 12/24* (2006.01)
(Continued)

(52) U.S. Cl.
CPC ........... *H04L 41/0226* (2013.01); *H04L 45/46* (2013.01); *H04L 45/58* (2013.01)

(58) Field of Classification Search
CPC ...... H04L 41/0806; H04L 45/02; H04L 45/46; H04L 12/4625; H04L 12/4641; H04L 41/0226; H04L 45/58; G06F 11/0006; G06F 11/181
(Continued)

(56) References Cited

U.S. PATENT DOCUMENTS 6,058,116 A * 5/2000 Hiscock ................ H04L 45/02
370/401
6,085,238 A * 7/2000 Yuasa ................ H04L 12/4641
370/409
(Continued)

FOREIGN PATENT DOCUMENTS

CN 1505325 A 6/2004
CN 1619478 A 5/2005
(Continued)

OTHER PUBLICATIONS

Zhang et al., "The Realization of Multilayer Roaming and Interconnected Trunking System," Chinese Journal of Electron Devices, vol. 28, No. 2, pp. 446-449, Southeast University, Nanjing, China (Jun. 2005).

*Primary Examiner* — Dustin Nguyen
(74) *Attorney, Agent, or Firm* — Leydig, Voit & Mayer, Ltd.

(57) ABSTRACT

A method of interface registration for a network device to join in a cluster system, comprises: when the network device joins in the cluster system, the network device's local interconnection board sends its board number to the network device's local main control board, the network device's local non-interconnection board receives the board number sent by the local main control board, wherein the local interconnection board is a board on which interfaces for interconnecting the network device to network devices in the cluster system are located; after the cluster interface registration of the local non-interconnection board and local interconnection board on the cluster main control board, the local non-interconnection board and the local interconnection board receive and store a mapping relationship between local interface information of the network device and global (Continued)

interface information of the network device sent by the cluster main control board respectively.

8 Claims, 7 Drawing Sheets

(51) Int. Cl.
    *H04L 12/775*    (2013.01)
    *H04L 12/715*    (2013.01)

(58) Field of Classification Search
    USPC ........ 709/201, 223; 370/252, 386, 392, 401, 370/409; 714/4.11
    See application file for complete search history.

(56) References Cited

U.S. PATENT DOCUMENTS

| | | | |
|---|---|---|---|
| 6,725,261 B1* | 4/2004 | Novaes | G06F 11/006 709/201 |
| 2003/0169734 A1* | 9/2003 | Lu | H04L 45/02 370/386 |
| 2004/0103244 A1 | 5/2004 | Fujimoto et al. | |
| 2004/0107276 A1 | 6/2004 | Mo | |
| 2008/0270701 A1 | 10/2008 | Fujimoto et al. | |
| 2010/0162036 A1* | 6/2010 | Linden | G06F 11/181 714/4.11 |
| 2010/0162271 A1 | 6/2010 | Arimilli et al. | |
| 2011/0208844 A1 | 8/2011 | Zhu et al. | |
| 2011/0268120 A1* | 11/2011 | Vobbilisetty | H04L 45/46 370/392 |
| 2011/0299413 A1* | 12/2011 | Chatwani | H04L 12/4625 370/252 |
| 2014/0244819 A1* | 8/2014 | Patrick | H04L 41/0806 709/223 |

FOREIGN PATENT DOCUMENTS

| | | |
|---|---|---|
| CN | 1735094 A | 2/2006 |
| CN | 102006223 A | 4/2011 |
| WO | WO 2010048875 A1 | 5/2010 |
| WO | WO 2011017845 A1 | 2/2011 |

\* cited by examiner

METHOD AND DEVICE OF INTERFACE REGISTRATION FOR A NETWORK DEVICE TO JOIN IN A CLUSTER SYSTEM

CROSS-REFERENCE TO RELATED APPLICATIONS

This application is a continuation of International Patent Application No. PCT/CN2011/077437, filed on Jul. 21, 2011, which is hereby incorporated by reference in its entirety.

TECHNICAL FIELD

The present application relates to the field of communication technology, and more specifically, to a method and device of interface registration for a network device to join in a cluster system.

BACKGROUND

A clustered network interconnects multiple physically independent network devices to form a logically integrated system. All independent network devices in a clustered network are invisible to the outside and are managed in a centralized manner. These network devices are operated as a single device, which greatly simplifies device operation and maintenance.

The existing clustered network interconnects multiple physically independent network devices in a star topology through an additional central switching frame. A main control board of the cluster is also located on a certain board of the central switching frame. Intra-frame interconnection and inter-frame interconnection are realized in the same manner, and the interface registration for a network device to join in a cluster system and the management flow after joining in the cluster are the same as those for non-clustered devices. Such clustered network formed through interconnecting special hardware is efficient in communication, has large throughput for both intra-frame forwarding and inter-frame forwarding, low latency, and is transparent to upper level software system.

However, the above clustered network employs special hardware to interconnect network devices. After having joined in a cluster system, such network devices can only operate in a cluster mode, and cannot select operation modes, e.g., select to operate in a stand-alone mode or a cluster mode. Therefore, network devices are unable to on-line switch between stand-alone operation and joining in a cluster.

SUMMARY

Embodiments of the application provide a method and device of interface registration for a network device to join in a cluster system, which overcome the defect that network devices in existing cluster system are unable to select whether to operate in a stand-alone mode or a cluster mode, and achieve the purpose of enabling network devices to on-line switch between stand-alone operation and joining in a cluster.

An embodiment of the application provides a method of interface registration for a network device to join in a cluster system, wherein the cluster system comprises a cluster main device, and a main control board on the cluster main device is a cluster main control board, the method comprising:

when a network device joins in a cluster system, a local interconnection board of the network device sending its board number to a local main control board, a local non-interconnection board of the network device receiving the board number of the local interconnection board sent by the local main control board of the network device, wherein the local interconnection board is an line card on which interfaces for interconnecting the network device to network devices in the cluster system are located;

after the local non-interconnection board and the local interconnection board having performed cluster interface registration on the cluster main control board, the local non-interconnection board and the local interconnection board receiving and storing a mapping relationship between local interface information of the network device and global interface information of the network device sent by the cluster main control board, respectively, wherein the local interface information of the network device comprises local interface information of all local line cards of the network device.

An embodiment of the application provides a network device, comprising: a local main control board, a local interconnection board, and a local non-interconnection board.

The local interconnection board is configured to send its board number to the local main control board when the network device joins in a cluster system; the local interconnection board is an line card on which interfaces for interconnecting the network device to network devices in the cluster system are located; the cluster system comprises a cluster main device, a main control board on the cluster main device is a cluster main control board;

the local non-interconnection board is configured to receive the board number of the local interconnection board sent by the local main control board;

the local interconnection board is further configured to receive and store a mapping relationship between local interface information of the network device and global interface information of the network device sent by the cluster main control board after the cluster interface registration on the cluster main control board, wherein the local interface information of the network device comprises local interface information of all local line cards of the network device;

the local non-interconnection board is further configured to receive and store a mapping relationship between local interface information of the network device and global interface information of the network device sent by the cluster main control board after the cluster interface registration on the cluster main control board.

In the method and device of interface registration for a network device to join in a cluster system of embodiments of the application, a cluster system is constructed by interconnecting a network device with other network devices through interconnection interface on its interconnection board, so no hardware is required to connect the network device to the cluster system, and thus there are no limits on operation modes of the network device imposed by hardware connection. When a network device in stand-alone operation mode joins in a cluster system, each line card obtains a mapping relationship between local interface information and global interface information through cluster interface registration. Thereby, each line card of the network device can be separately managed by the network device or centrally managed by the cluster system; the network device can select to operate in a stand-alone mode or a cluster mode, and thus on-line switch between stand-alone operation and cluster operation.

BRIEF DESCRIPTION OF THE DRAWINGS

For a more explicit description of technical solutions of embodiments of the application or the prior art, a brief introduction of accompanying drawings to be used in the description of these embodiments and the prior art will be given below. Obviously, accompanying drawings described below are merely some embodiments of the application. For those skilled in the art, other accompanying drawings can be derived from these ones without any creative efforts.

EMBODIMENTS

In order to make objects, technical solutions, and advantages of the embodiments of the application clear, a clear and comprehensive description of technical solutions of embodiments of the application will be given in connection with accompanying drawings of those embodiments of the application. Obviously, embodiments described herein are merely some of the embodiments of the application, but not all of them. Based on those embodiments of this application, other embodiments can occur to those skilled in the art without any creative efforts, all of which fall within the scope of the application.

Figure 1A:
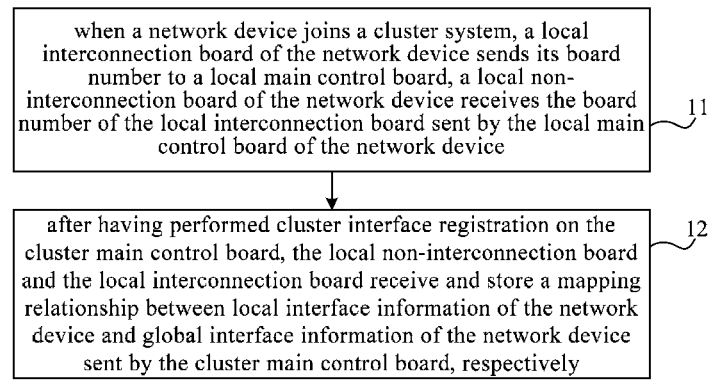
FIG. 1A is a flow chart of a method of interface registration for a network device to join in a cluster system provided in an embodiment of the application.
Figure 1B:
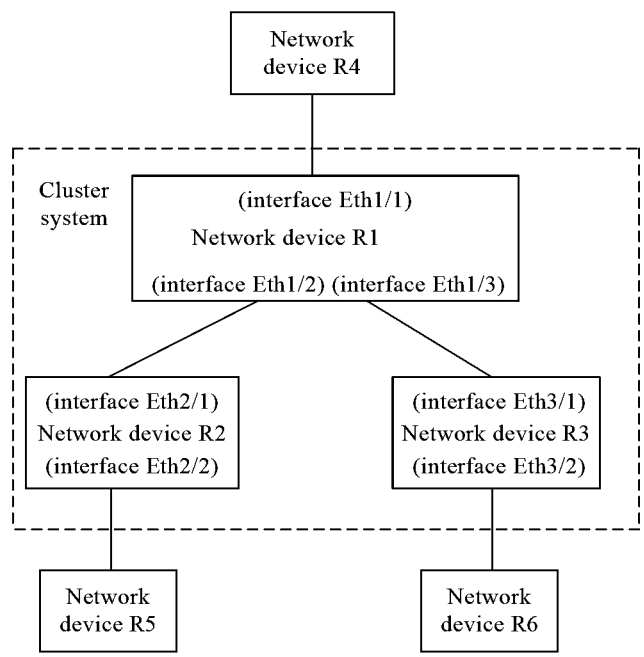
FIG. 1B is a schematic structure diagram of a cluster system provided in an embodiment of the application.

FIG. 1A is a flow chart of a method of interface registration for a network device to join in a cluster system provided in an embodiment of this application. FIG. 1B is a schematic structure diagram of a cluster system provided in an embodiment of this application. The cluster system comprises one or more network devices for managing the cluster system, i.e., cluster main devices, other network devices to join in the cluster system are cluster secondary devices. Each network device comprises a main control board and multiple line cards. Upon entering a cluster operation mode, the main control board of a cluster main device functions as a cluster main control board, the main control boards of the cluster secondary devices are secondary main control board, the cluster main control board can centrally manage all line cards within the cluster system.

In the system, the main control board of each network device comprises a primary main control board and a backup main control board. The backup main control board is a backup board for the primary main control board and operates as a substitute of the primary main control board when the primary main control board fails. Each line card comprises multiple interfaces, interconnection interfaces are interfaces by which a network device to which the interfaces belong is interconnected to other network devices in a cluster system, and an interconnection board is an line card on which those interconnection interfaces are located. A cluster system is constructed by interconnecting cluster devices through interconnection interfaces in embodiments of the application, wherein data packets and control signalings of the cluster share a same interface. As shown in FIG. 1B, a cluster system consists of a network device R1, a network device R2 and a network device R3, wherein the network device R1 is a cluster main device for managing the cluster system. A network device R4, a network device R5 and a network device R6 are external network devices of the cluster system. Interfaces Eth1/2, Eth1/3, Eth2/1 and Eth3/1 are all interconnection interfaces of the cluster system described above, and other interfaces Eth1/1, Eth2/2 and Eth3/2 are non-interconnection interfaces.

Embodiments of the application primarily illustrate how to perform interface registration of various line cards for a network device to join in a cluster system. As shown in FIG. 1A, an embodiment of the application comprises the following steps.

At step 11, when a network device joins a cluster system, a local interconnection board of the network device sends its board number to a local main control board, and a local non-interconnection board of the network device receives the board number of the local interconnection board sent by the local main control board of the network device.

The network device, after powered on, operates in a stand-alone mode, each of the line cards performs local interface registration on the local main control board, and obtains local interface information sent by the local main control board. In the network device provided in the embodiment of the application, any communication mechanism between boards in the prior art can be employed for the communication between the main control board and the line cards. After the network device has entered a cluster operation status by command triggering or manual configuration, an interconnection board on the network device first reports its board number to a local main control board. After receiving the board number of the interconnection board, the local main control board notifies the board number of the local interconnection board to other line cards, i.e., non-interconnection boards. After acquiring the board number of the local interconnection board, the local non-interconnection board uses the board number of the local interconnection board as a communication agent board number for communicating with other network devices.

After the network device has entered the cluster operation status, when the non-interconnection board and the main control board in the network device communicate cluster internal information in the cluster system with other network devices in the cluster system, it is necessary to forward the information by the local interconnection board (the interconnection board on the network device). The interconnection board serves as a communication agent in the communication between a network device to which the interconnection board belongs and other network devices, and the interconnection board is used particularly for forwarding local manage information or local control information (information from the main control board on the network device to which the interconnection board belongs, or information from the non-interconnection board on the network device to which the interconnection board belongs) to other network devices, receiving manage information of other network devices or control information of other network devices and forwarding the information to a target board. For example, when a non-interconnection board performs interface registration on a cluster main control board of a cluster main device through a local interconnection board, it is necessary to forward cluster registration information to the cluster main control board through the local interconnection board, and receive global interface information sent by the cluster main control board. Therefore, the local non-interconnection board needs to acquire the board number of the local interconnection board, the board number of the local interconnection board is named as communication agent board number.

At step 12, after performing cluster interface registration on the cluster main control board, the local non-interconnection board and the local interconnection board receive and store a mapping relationship between local interface information of the network device and global interface information of the network device sent by the cluster main control board, respectively.

In the embodiment of the application, when line cards perform cluster interface registration on a cluster main control board, each of the line cards can send a request for cluster interface registration to the cluster main control board, respectively, or a local main control board can send requests for cluster registration of all local line cards to the cluster main control board on behalf of each line cards. The cluster main device numbers all line cards on each network device in the cluster system, and assigns index to each line card to form global interface information of the cluster system. After the cluster main control board has sent the global interface information of the network device to the network device, each line card receives and stores a mapping relationship between local interface information of the network device and global interface information of the network device sent by the cluster main control board. The local interface information of the network device comprises local interface information of all local line cards of the network device.

Cluster interface registration on a cluster main control board performed by line cards of a network device will be described on three cases. In the first case, a local interconnection board sends a request for cluster registration of all local line cards to a cluster main control board through an interconnection board on a cluster main device; after the cluster main control board sends global interface information of the network device, a local main control board creates a mapping relationship between the global interface information of the network device and the local interface information of the network device, and sends the mapping relationship to each of the line cards. In another case, a local interconnection board sends requests for cluster registration of all local line cards to a cluster main control board through an interconnection board on a cluster main device; after the cluster main control board sends global interface information of the network device, the local interconnection board creates a mapping relationship between the global interface information and local interface information of the network device, and sends the mapping relationship to each of line cards. In a still another case, a local main control board sends requests for cluster registration of all local line cards to a cluster main control board through a local interconnection board, after the cluster main control board sends global interface information of the network device, the local main control board creates a mapping relationship between the global interface information and local interface information of the network device, and sends the mapping relationship to each of line cards.

In the method of interface registration for a network device to join in a cluster system of the embodiment of the application, a cluster system is constructed by interconnecting a network device through interconnection interfaces on its interconnection board with other network devices, so no hardware is needed to connect the network device to the cluster system, and thus there are no limits on operation modes of the network device imposed by hardware connection. When a network device in stand-alone operation mode joins in a cluster system, each line card obtains a mapping relationship between local interface information and global interface information through cluster interface registration. Thereby, each line card of the network device can be separately managed by the network device to which it belongs, or centrally managed by the cluster system; the network device can select to operate in a stand-alone mode or a cluster mode, and thus may on-line switch between stand-alone operation and cluster operation.

Figure 2A:
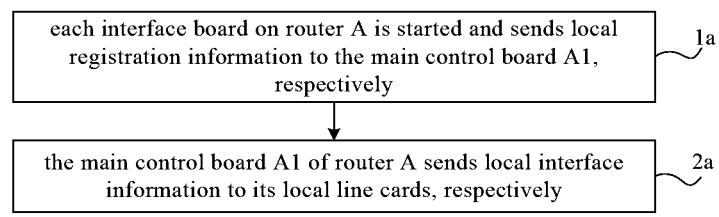
FIG. 2A is a flow chart of local interface registration in another method of interface registration for a network device to join in a cluster system provided in an embodiment of the application.
Figure 2B:
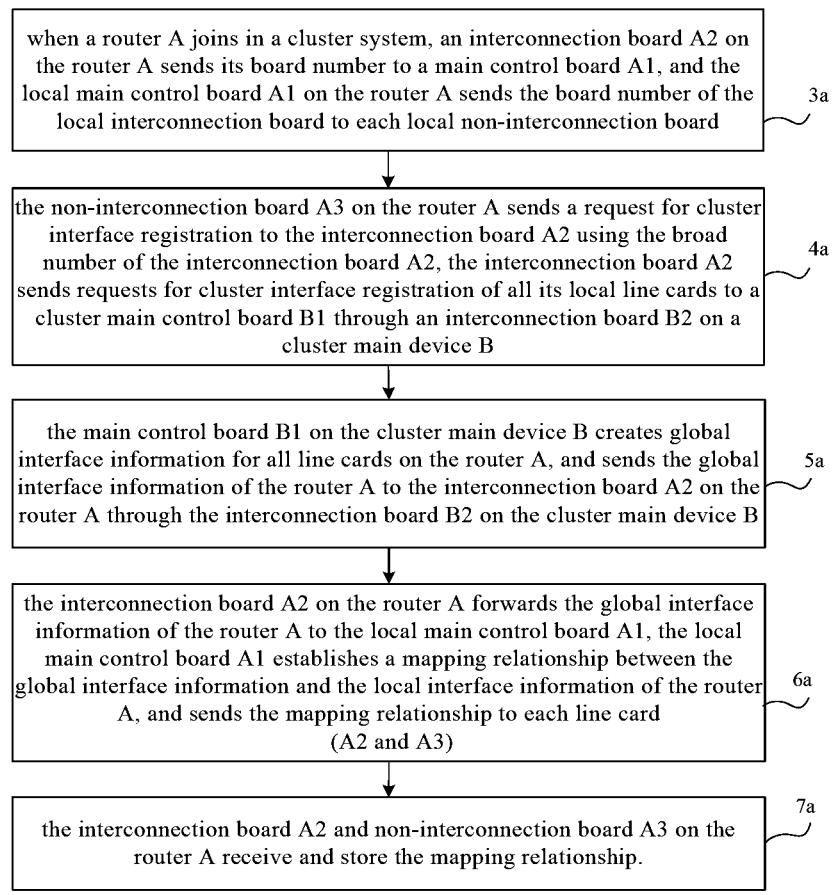
FIG. 2B is a flow chart of the cluster interface registration of line cards on a cluster secondary device in another method of interface registration for a network device to join in a cluster system provided in an embodiment of the application.
Figure 2C:
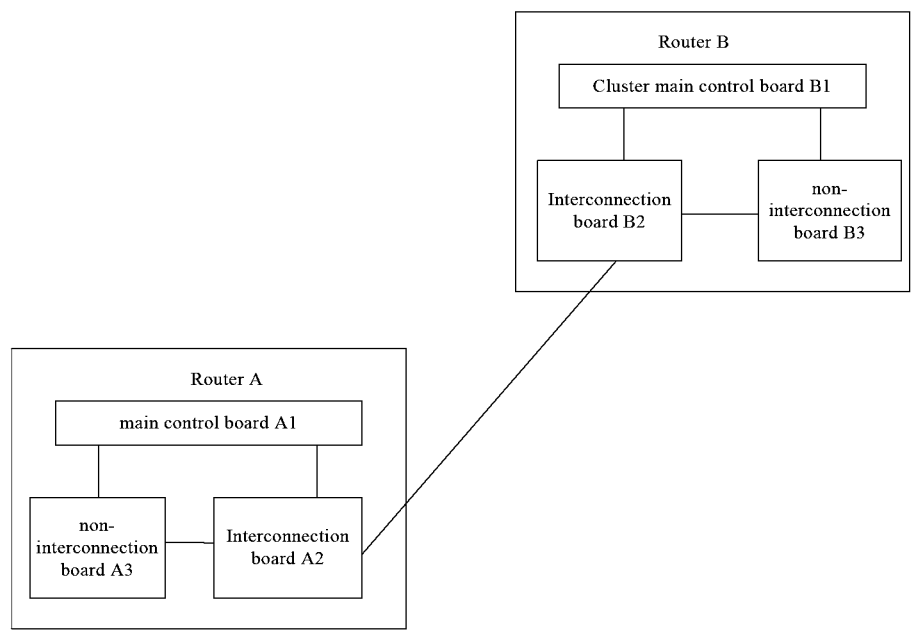
FIG. 2C is a diagram of an application scenario provided in an embodiment of the application.

FIG. 2A is a flow chart of the local interface registration of a router A in another method of interface registration for a network device to join in a cluster system provided in an embodiment of the application. FIG. 2B is a flow chart of the cluster interface registration of a router A in another method for interface registration for a network device to join in a cluster system provided in an embodiment of the application. FIG. 2C is a diagram of an application scenario provided in an embodiment of the application. The network device in the embodiment is a router. As shown in FIG. 2C, the router A comprises a main control board A1, and two line cards: an interconnection board A2 and a non-interconnection board A3; the router B comprises a main control board B1, and two line cards: an interconnection board B2 and a non-interconnection board B3. The router B is a cluster main device in the cluster system, while the router A is a cluster secondary device in the cluster system. The main control board B1 of the router B is a cluster main control board. The main control board A1 of the router A is a secondary main control board.

As shown in FIG. 2A, local interface registration provided in the embodiment comprises the following steps:

At step 1a, each line card on the router A is started and sends local registration information to the main control board A1, respectively.

After power on of the router A, its local main control board is started, and the router A enters a stand-alone operation mode, the router A establishes communication connections with other routers, for example, establishing connections through a connection or connectionless transmission protocol, such as the Internet Protocol (Internet Protocol, abbreviated as IP), Transmission Control Protocol (Transmission Control Protocol, abbreviated as TCP), or User Datagram Protocol (User Datagram Protocol, abbreviated as UDP), etc. Each line card of the router A sends local registration information to the main control board of the router A, respectively after the line card of the router A starts up, wherein, the local registration information comprises serial number of each line card (frame number of the router to which an line card belongs+the board number of the line card), quantity of interfaces, interface type, interface rate and interface index, etc.

Likewise, after the startup of the main control board of the router B, a communication agent which is used in the communication between routers in the stand-alone operation mode is initiated. Each line card on the router B sends local registration information to the main control board of the router B, respectively, after the line card on the router B starts up.

At step 2a, the main control board A1 of the router A sends local interface information to its local line card, respectively, wherein the local interface information comprises IP address of each line card and Forwarding Information Base (FIB) of each line card, board number, and interface index. Generally, the interface index of the local interface information is a global interface index.

The main control board of the router A sends local interface information to its local line card (interconnection board A2 and non-interconnection board A3), respectively. Local interface information of each line card of router A is illustrated in Table 1.

TABLE 1 is local interface information of each line card of router A

| Line card | Serial Number. (frame No. + board No.) | IP address | FIB | Local interface index | Local board No. |
|---|---|---|---|---|---|
| A2 | A + 002 | ... | ... | ... | 2 |
| A3 | A + 003 | ... | ... | ... | 3 |

Below, first of all, a cluster interface registration process of each line card when router A joins in a cluster system will be described. In the cluster interface registration of each line card of the embodiment, each line card initiates a request for cluster interface registration. As shown in FIG. 2B, the cluster interface registration process provided in the embodiment comprises the following steps:

At step 3a, when a router A joins in a cluster system, an interconnection board A2 on the router A sends its board number to a main control board A1, and the main control board A1 on the router A sends the board number of the local interconnection board to each local non-interconnection board.

When the router A joins in a cluster system, the interconnection board A2 on the router A sends its board number to the main control board A1, and the main control board A1 on the router A sends the board number of the interconnection board A2 to a non-interconnection board A3. The non-interconnection board A3 on the router A uses the board number of the interconnection board A2 as a communication agent board number.

At step 4a, the non-interconnection board A3 on the router A sends a request for cluster interface registration to the interconnection board A2 through the broad number of the interconnection board A2, the interconnection board A2 sends requests for cluster interface registration of all its local line cards to a cluster main control board B1 through an interconnection board B2 on a cluster main device B.

Wherein, the request for cluster interface registration comprises: serial number of each line card (frame number of the router to which an line card belongs+the board number of the line card), number of interfaces, interface type, interface rate and interface index, etc.

As to the interconnection board A2 on the router A, the interconnection board A2 sends its request for cluster interface registration to the interconnection board B2 on the router B, and the interconnection board B2 forwards the request to the cluster main control board B1 on the router B.

As to the non-interconnection board A3 on the router A, the non-interconnection board A3 determines the local interconnection board A2 through the communication agent board number, and sends its request for cluster interface registration to the interconnection board A2. The request for cluster interface registration of the non-interconnection board A3 is sent to the interconnection board B2 on the router B by the interconnection board A2, and is forwarded to the cluster main control board B1 on the router B through the interconnection board B2.

When the interconnection board A2 sends requests for cluster interface registration of all local line cards to the cluster main control board B1 through the interconnection board B2 on the cluster main device B, the interconnection board A2 may send the request for cluster interface registration of each line card to the interconnection board B2 on the cluster main device B one by one, or send the requests for cluster interface registration of various line cards to the interconnection board B2 on the cluster main device B all together.

At step 5a, the main control board B1 on the cluster main device B creates global interface information for all line cards on the router A, and sends the global interface information of the router A to the interconnection board A2 on the router A through the interconnection board B2 on the cluster main device B.

Generally, when a router joins in a cluster system for the first time, a cluster main control board sends global interface information to the router again. If the router has been added to the cluster system previously, the cluster main control board may assign the previous global interface information to the router, that is, the network device reuses the previous global interface information. Instead, new global interface information may be assigned to the network device.

After the cluster main control board B1 has received requests for cluster interface registration of various line cards on the router A, in order to enable the router A to communicate in the cluster system using the global interface information, the cluster main control board B1 numbers all line cards on the router A based on existing global interface information, and sends global interface information of all line cards on the router A to the router A. In addition, the cluster main control board B1 also sends global interface information of all line cards in the cluster system to the router A. If the cluster main control board B1 only sends global interface information of all line cards on the router A to the router A, when the router A communicates with other routers in the cluster system, the router A first obtains global interface information of line cards on the other routers from the cluster main control board B1.

At step 6a, the interconnection board A2 on the router A forwards the global interface information of the router A to the main control board A1, the main control board A1 establishes a mapping relationship between the global interface information of the router A and the local interface information of the router A, and sends the mapping relationship to various line cards (A2 and A3).

At step 7a, the interconnection board A2 and non-interconnection board A3 on the router A receive and store the mapping relationship.

The main control board B1 on the router B sends the global interface information of the router A to the interconnection board B2, and the interconnection board B2 forward the global interface information to the interconnection board A2 of the router A. The main control board A1 establishes a mapping relationship between the global interface information and the local interface information, and sends the mapping relationship to the interconnection board A2 and the non-interconnection board A3, respectively.

Table 2 shows the global interface information of various line cards in the cluster system shown in FIG. 2C. As shown in table 2, the global interface information comprises global board numbers of various line cards. In general, the local interface index of various line cards is a global interface index. Therefore, when the global interface information is sent, the interface index may not be sent.

TABLE 2 global interface information of various line cards in the cluster system

| Line card | Frame No. + board No. | Global board No. |
|---|---|---|
| B2 | B + 002 | 1 |
| B3 | B + 003 | 2 |
| A2 | A + 002 | 3 |
| A3 | A + 002 | 4 |

The main control board A1 establishes a mapping relationship between the local interface information and the global interface information as shown in table 3, and sends the mapping relationship to the non-interconnection board.

TABLE 3 mapping relationship between local interface information of router A and global interface information of router A

| Line card | Frame No. + board No. | Local board No. | Global board No. |
|---|---|---|---|
| A2 | A + 002 | 2 | 3 |
| A3 | A + 002 | 3 | 4 |

Figure 2D:
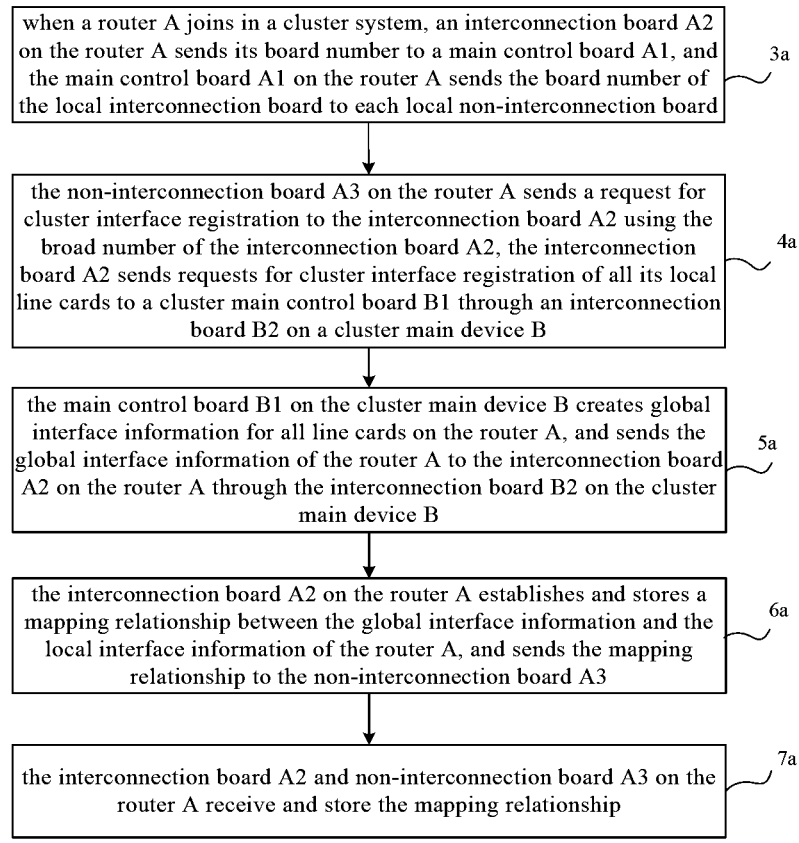
FIG. 2D is a flow chart of the cluster interface registration of line cards on a cluster secondary device in a further method of interface registration for a network device to join in a cluster system provided in an embodiment of the application.

As shown in FIG. 2D, step 6a may be: the interconnection board A2 on the router A establishes and stores a mapping relationship between the global interface information of the router A and the local interface information of the router A, and sends the mapping relationship to the non-interconnection board A3.

Figure 2E:
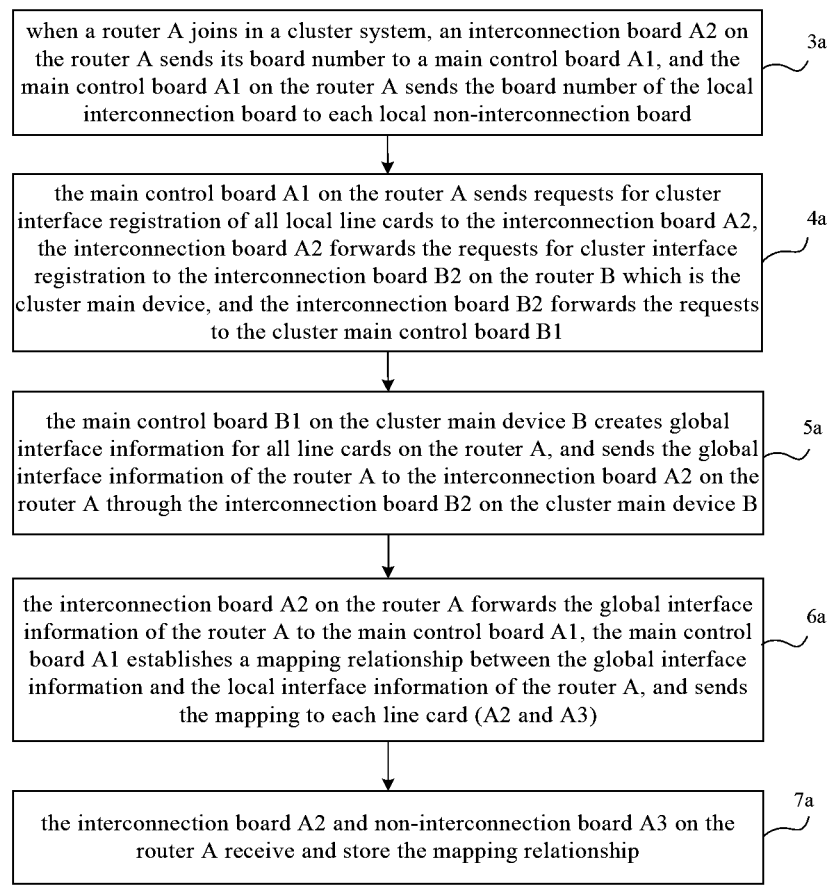
FIG. 2E is a flow chart of the cluster interface registration of line cards on a cluster secondary device in another method of interface registration for a network device to join in a cluster system provided in an embodiment of the application.

As shown in FIG. 2E, step 4a may be: the main control board A1 on the router A sends requests for cluster interface registration of all local line cards to the interconnection board A2, the interconnection board A2 forwards the requests for cluster interface registration to the interconnection board B2 on the router B which is the cluster main device, and the interconnection board B2 forwards the requests to the cluster main control board B1. That is, in the cluster interface registration of various line cards on a network device, a main control board on the network device sends requests for cluster interface registration on behalf of various line cards.

The process of cluster interface registration of various line cards on a cluster main device is as follows. Line cards on the cluster main device directly send cluster registration information to a cluster main control board on the cluster main device, and the cluster main control board sends a mapping relationship between local interface information and global interface information to line cards on the cluster main device. Besides, each line card on the cluster main device may not initiate the cluster registration procedure to the cluster main control board.

In the embodiment of this application, each line card can perform cluster interface registration on a cluster main control board; alternatively, a local main control board may perform cluster interface registration on the cluster main control board on behalf of each local line card. After a local interconnection board has received global interface information sent by the cluster main control board, the local interconnection board can establish a mapping relationship between the global interface information and local interface information; alternatively, the mapping relationship between global interface information and local interface information also can be established by a local main control board.

Figure 3:
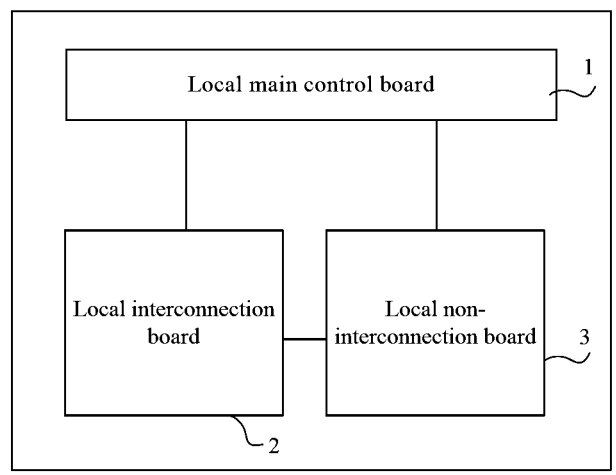
FIG. 3 is a schematic structure diagram of a network device provided in an embodiment of the application.

FIG. 3 is a schematic structure diagram of a network device provided in an embodiment of the application. As shown in FIG. 3, the network device comprises: a local main control board 1, a local interconnection board 2, and a local non-interconnection board 3, wherein the local interconnection board 2 and the local non-interconnection board 3 are line card.

The local interconnection board 2 is configured to send its board number to the local main control board when the network device joins in a cluster system; the cluster system comprises a cluster main device, a main control board on the cluster main device being a cluster main control board; the local interconnection board is an line card on which interfaces for interconnecting the network device to network devices in the cluster system are located.

The local non-interconnection board 3 is configured to receive board number of the local interconnection board sent by the local main control board 1.

The local interconnection board 2 is further configured to receive and store a mapping relationship between local interface information of the network device and global interface information of the network device sent by the cluster main control board, after the cluster interface registration on the cluster main control board; the local interface information of the network device comprising local interface information of all local line cards of the network device.

The local non-interconnection board 3 is further configured to receive and store a mapping relationship between local interface information of the network device and global interface information of the network device sent by the cluster main control board, after the cluster interface registration on the cluster main control board.

The network device described above can be used in the method provided in the corresponding embodiment of FIG. 1A, the functions of the network device described above may refer to the description in the corresponding embodiment of FIG. 1A, and will not be described in detail herein.

The network device of the embodiment of the application interconnects with other network devices through interconnection interfaces on its interconnection board to form a cluster system, without using special hardware to be connected to the cluster system, thus the operation modes imposed by hardware connection are not limited. When a network device in a stand-alone operation mode joins in a cluster system, each line card obtains a mapping relationship between local interface information and global interface information through cluster interface registration. Therefore, each line card of the network device can be separately managed by a network device to which the line card belongs or centrally managed by the cluster system; the network device may select to operate in a stand-alone mode or a cluster mode, and thus on-line switch between stand-alone operation and a cluster operation.

Further, line cards send requests for cluster interface registration to a cluster main control board, and a local main control board establishes a mapping relationship as follows.

A local interconnection board 2 is particularly configured to send its board number to a local main control board, when a network device joins in a cluster system. A local non-interconnection board 3 is particularly configured to receive the board number of the local interconnection board sent by the local main control board.

The local non-interconnection board 3 is further configured to send a request for cluster interface registration to the local interconnection board using the board number of the local interconnection board. The local interconnection board 2 is further configured to send requests for cluster interface registration of all local line cards to the cluster main control board through an interconnection board of a cluster main device.

The local interconnection board 2 is further configured to forward global interface information to the local main control board after receiving the global interface information of the network device sent by the cluster main control board. A local main control board 1 is particularly configured to establish a mapping relationship between local interface information and global interface information, and send the mapping relationship to the local interconnection board and local non-interconnection board. The local non-interconnection board 3 is further configured to receive and store the mapping relationship sent by the local main control board. The local interconnection board 2 is further configured to receive and store the mapping relationship sent by the local main control board.

Further, line cards send requests for cluster interface registration to a cluster main control board, and a local interconnection board establishes a mapping relationship as follows.

A local interconnection board 2 is particularly configured to send its board number to a local main control board when a network device joins in a cluster system.

A local non-interconnection board 3 is particularly configured to receive the board number of the local interconnection board sent by the local main control board.

The local non-interconnection board 3 is further configured to send a request for cluster interface registration to the local interconnection board using the board number of the local interconnection board.

The local interconnection board 2 is further configured to send requests for cluster interface registration of all local line cards to a cluster main control board through an interconnection board of a cluster main device.

The local interconnection board 2 is further configured to establish and store a mapping relationship between the local interface information and the global interface information after receiving the global interface information of the device sent by the cluster main control board, and send the mapping relationship to the local non-interconnection board.

The local non-interconnection board 3 is further configured to receive and store the mapping relationship sent by the local interconnection board.

Further, a local main control board sends requests for cluster interface registration to a cluster control board on behalf of line cards, and a local interconnection board establishes a mapping relationship as follows.

A local interconnection board 2 is particularly configured to send its board number to a local main control board when the network device joins in a cluster system.

A local non-interconnection board 3 is particularly configured to receive the board number of the local interconnection board sent by the local main control board.

A local main control board 1 is particularly configured to send requests for cluster interface registration of all local line cards to the local interconnection board using the board number of the local interconnection board.

The local interconnection board 2 is further configured to send the requests for cluster interface registration to a cluster main control board through an interconnection board on a cluster main device.

The local interconnection board 2 is further configured to forward global interface information to the local main control board after receiving the global interface information of the network device sent by the cluster main control board.

The local main control board 1 is further configured to establish a mapping relationship between local interface information and global interface information, and send the mapping relationship to the local interconnection board and the local non-interconnection board.

The local non-interconnection board 3 is further configured to receive and store the mapping relationship sent by the local main control board.

The local interconnection board 2 is further configured to receive and store the mapping relationship sent by the local main control board.

In the embodiment of the application, cluster interface registration can be performed on a cluster main control board by each line card, or performed by a local main control board on behalf of each local line card. After the local interconnection board has received the global interface information sent by the cluster main control board, a local interconnection board may establish a mapping relationship between local interface information and global interface information or the local main control board may establish the mapping relationship between local interface information and global interface information.

Those ordinary skilled in the art may understand that all or part steps of the above method embodiments can be implemented by program instruction relevant hardware, the program described above can be stored in a computer readable storage medium, which, when being executed, may perform steps contained in the above method embodiments. The storage medium described above may comprise: ROM, RAM, magnetic discs, optical discs and various mediums capable of storing program codes.

At last, it should be noted that the above embodiments are merely given to illustrate the technical solution of the application, and are not limitation of the application. Although the application has been described in detail according to the above embodiments, those skilled in the art may appreciate that modifications to the technical solution described in various embodiment or alternations of its some parts can be made; those modifications and alternations may not cause the subject matters of corresponding technical solutions to depart from the spirits and scopes of the technical solutions of various embodiments of the application.

What is claimed is:

1. A method of interface registration for a network device to join in a cluster system, wherein the cluster system comprises a cluster main device, a cluster main control board on the cluster main device, the method comprising:

when the network device joins in the cluster system,
sending by a local interconnection board of the network device a board number of the local interconnection board to a local main control board of the network device;

receiving, by a local non-interconnection board of the network device, the board number of the local interconnection board sent by the local main control board of the network device, wherein the local interconnection board is a line card on which interfaces for interconnecting the network device to network devices in the cluster system are located;

after the cluster interface registration of the local non-interconnection board and local interconnection board on the cluster main control board, receiving and storing, by the local non-interconnection board and local interconnection board, a mapping relationship between local interface information of the network device and global interface information of the network device sent by the cluster main control board, wherein the local interface information of the network device comprises local interface information of all local line cards of the network device.

2. The method according to claim 1, wherein the receiving and storing by the local non-interconnection board and local interconnection board, a mapping relationship between local interface information of the network device and global interface information of the network device sent by the cluster main control board respectively, comprises:

sending by the local non-interconnection board a request for cluster interface registration to the local interconnection board using the board number of the local interconnection board;

sending by the local interconnection board the requests for cluster interface registration of all local line cards to the cluster main control board through an interconnection board on the cluster main device;

forwarding by the local interconnection board global interface information to the local main control board after receiving the global interface information of the network device sent by the cluster main control board;

establishing by the local main control board a mapping relationship between the local interface information and the global interface information, and sending the mapping relationship to the local interconnection board and the local non-interconnection board;

receiving and storing, by the local interconnection board and the local non-interconnection board, the mapping relationship, respectively.

3. The method according to claim 1, after a cluster interface registration of the local non-interconnection board and local interconnection board on the cluster main control board, the receiving and storing, by the local non-interconnection board and the local interconnection board, a mapping relationship between local interface information of the network device and global interface information of the network device sent by the cluster main control board, comprises:

sending by the local main control board requests for cluster interface registration of all local line cards to the local interconnection board using the board number of the local interconnection board;

sending by the local interconnection board the requests for cluster interface registration to the cluster main control board through an interconnection board on the cluster main device;

forwarding by the local interconnection board the global interface information of the network device to the local main control board after receiving the global interface information sent by the cluster main control board;

establishing by the local main control board a mapping relationship between the local interface information and the global interface information, and sending the mapping relationship to the local interconnection board and the local non-interconnection board; and receiving and storing, by the local interconnection board and the local non-interconnection board, the mapping relationship.

4. The method according to claim 1, after a cluster interface registration of the local non-interconnection board and the local interconnection board on the cluster main control board, receiving and storing, by the local non-interconnection board and the local interconnection board, a mapping relationship between local interface information of the network device and global interface information of the network device sent by the cluster main control board, comprises:

sending by the local non-interconnection board a request for cluster interface registration to the local interconnection board using the board number of the local interconnection board;

sending by the local interconnection board the requests for cluster interface registration of all local line cards to the cluster main control board through an interconnection board on the cluster main device;

after receiving global interface information of the network device sent by the cluster main control board, establishing and storing by the local interconnection board a mapping relationship between the local interface information and the global interface information, and sending the mapping relationship to the local non-interconnection board;

receiving and storing by the local non-interconnection board the mapping relationship sent by the local interconnection board.

5. A network device, comprising: a local main control board, a local interconnection board, and a local non-interconnection board, wherein:

the local interconnection board is configured to send [a board number of the local interconnection board to the local main control board when the network device joins in a cluster system, the local interconnection board being a line card on which interfaces for interconnecting the network device to network devices in the cluster system are located; the cluster system comprising a cluster main device, and a cluster main control board on the cluster main device;

the local non-interconnection board is configured to receive the board number of the local interconnection board sent by the local main control board;

the local interconnection board is further configured to, after a cluster interface registration on the cluster main control board, receive and store a mapping relationship between local interface information of the network device and global interface information of the network device sent by the cluster main control board, wherein the local interface information of the network device comprises local interface information of all local line cards of the network device;

the local non-interconnection board is further configured to, after the cluster interface registration on the cluster main control board, receive and store a mapping relationship between local interface information of the network device and global interface information of the network device sent by the cluster main control board.

6. The device according to claim 5, wherein:

the local interconnection board is configured to send the board number of the local interconnection board to the local main control board when the network device joins in the cluster system;

the local non-interconnection board is configured to receive the board number of the local interconnection board sent by the local main control board;

the local non-interconnection board is further configured to send a request for cluster interface registration to the local interconnection board using the board number of the local interconnection board;

the local interconnection board is further configured to send requests for cluster interface registration of all local line cards to the cluster main control board through an interconnection board of the cluster main device;

the local interconnection board is further configured to forward the global interface information to the local main control board after receiving the global interface information of the network device sent by the cluster main control board;

the local main control board is configured to establish the mapping relationship between local interface information and global interface information, and send the mapping relationship to the local interconnection board and the local non-interconnection board;

the local non-interconnection board is further configured to receive and store the mapping relationship sent by the local main control board; and the local interconnection board is further configured to receive and store the mapping relationship sent by the local main control board.

7. The device according to claim 5, wherein:

the local interconnection board is configured to send the board number of the local interconnection board to the local main control board when the network device joins in the cluster system;

the local non-interconnection board is configured to receive the board number of the local interconnection board sent by the local main control board;

the local main control board is further configured to send a request for cluster interface registration of all the local line cards to the local interconnection board using the board number of the local interconnection board;

the local interconnection board is further configured to send the requests for cluster interface registration to the cluster main control board through an interconnection board of the cluster main device;

the local interconnection board is further configured to forward global interface information to the local main control board after receiving the global interface information of the network device sent by the cluster main control board;

the local main control board is further configured to establish the mapping relationship between the local interface information and the global interface information, and send the mapping relationship to the local interconnection board and the local non-interconnection board;

the local non-interconnection board is further configured to receive and store the mapping relationship sent by the local main control board; and the local interconnection board is further configured to receive and store the mapping relationship sent by the local main control board.

8. The device according to claim 5, wherein:

the local interconnection board is configured to send the board number of the local interconnection board to the local main control board when the network device joins in the cluster system;

the local non-interconnection board is configured to receive the board number of the local interconnection board sent by the local main control board;

the local non-interconnection board is further configured to send a request for cluster interface registration to the local interconnection board using the board number of the local interconnection board;

the local interconnection board is further configured to send requests for cluster interface registration of all local line cards to the cluster main control board through an interconnection board on the cluster main device;

the local interconnection board is further configured to, after receiving global interface information of the device sent by the cluster main control board, establish and store the mapping relationship between the local interface information and global interface information, and send the mapping relationship to the local non-interconnection board; and the local non-interconnection board is further configured to receive and store the mapping relationship sent by the local interconnection board.

* * * * *